United States Patent
Asanuma et al.

(10) Patent No.: US 7,907,675 B2
(45) Date of Patent: Mar. 15, 2011

(54) RADIO COMMUNICATION SYSTEM AND RADIO COMMUNICATION METHOD

(75) Inventors: Yutaka Asanuma, Tokyo (JP); Shigeo Terabe, Kawasaki (JP); Kengo Kurose, Hamura (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 827 days.

(21) Appl. No.: 11/897,226

(22) Filed: Aug. 29, 2007

(65) Prior Publication Data

US 2008/0181320 A1 Jul. 31, 2008

(30) Foreign Application Priority Data

Jan. 31, 2007 (JP) ................................. 2007-021961
Apr. 27, 2007 (JP) ................................. 2007-119931

(51) Int. Cl.
*H04L 27/28* (2006.01)
(52) U.S. Cl. ........................................ 375/260; 375/295
(58) Field of Classification Search .................. 375/260, 375/219, 222, 220, 295; 370/335, 319–321
See application file for complete search history.

(56) References Cited

U.S. PATENT DOCUMENTS

| 6,724,740 | B1* | 4/2004 | Choi et al. | 370/335 |
|---|---|---|---|---|
| 2005/0157803 | A1* | 7/2005 | Kim et al. | 375/260 |
| 2006/0133533 | A1* | 6/2006 | Khandekar et al. | 375/279 |
| 2006/0246916 | A1* | 11/2006 | Cheng et al. | 455/450 |
| 2006/0255989 | A1* | 11/2006 | Kim et al. | 341/120 |

OTHER PUBLICATIONS

3GPP TS 25.214 V5.11.0 (Jun. 2005), 6A HS-DSCH—related procedures pp. 27-35.

* cited by examiner

*Primary Examiner* — Emmanuel Bayard
(74) *Attorney, Agent, or Firm* — Maschoff Gilmore & Israelsen

(57) ABSTRACT

In step 5*a*, a mobile-station measures a reception level and an interference level with the other base-stations, for a base-station considered as a communication partner. In step 5*b*, the mobile-station transmits a measurement result obtained in step 5*a* as control information to the base-station considered as the communication partner. In step 5*c*, the base-station determines a transmission format in a transmission format candidate group used for the transmission to the mobile-station, on the basis of the control information, etc. If the base-station discriminates that an area where the mobile-station considered as the transmission destination is located has a great influence since an interference level indicated by the control information received from the mobile-station exceeds a preset threshold value, the base-station determines use of a transmission format in which repetition is executed at more than two times after executing interleaving resistant to the interference, in the transmission format candidate group.

8 Claims, 6 Drawing Sheets

| MCS | Modulation scheme M | Coding rate R | Parameter N of Repetition and Orthogonalization | Total coding rate Rt | Transmission speed relative value |
|---|---|---|---|---|---|
| 1 | QPSK | 1/8 | 1 | 1/8 | 1.000 |
| 1a | QPSK | 1/2 | 4 | 1/8 | 1.000 |
| 2 | QPSK | 1/6 | 1 | 1/6 | 1.333 |
| 2a | QPSK | 2/3 | 4 | 1/6 | 1.333 |
| 3 | QPSK | 1/4 | 1 | 1/4 | 2.000 |
| 3a | 16QAM | 1/2 | 4 | 1/8 | 2.000 |
| 4 | QPSK | 1/3 | 1 | 1/3 | 2.667 |
| 4a | 16QAM | 2/3 | 4 | 1/6 | 2.667 |
| 5 | QPSK | 1/2 | 1 | 1/2 | 4.000 |
| 6 | QPSK | 2/3 | 1 | 2/3 | 5.333 |
| 7 | 16QAM | 1/3 | 1 | 1/3 | 5.333 |
| 8 | 16QAM | 1/2 | 1 | 1/2 | 8.000 |
| 9 | 16QAM | 2/3 | 1 | 2/3 | 10.667 |
| 10 | 16QAM | 3/4 | 1 | 3/4 | 12.000 |
| 11 | 16QAM | 4/5 | 1 | 4/5 | 12.800 |

RADIO COMMUNICATION SYSTEM AND RADIO COMMUNICATION METHOD

CROSS-REFERENCE TO RELATED APPLICATIONS

This application is based upon and claims the benefit of priority from prior Japanese Patent Applications No. 2007-021961, filed Jan. 31, 2007; and No. 2007-119931, filed Apr. 27, 2007, the entire contents of both of which are incorporated herein by reference.

BACKGROUND OF THE INVENTION

1. Field of the Invention

The present invention relates to a radio communication system employing a communication scheme using multi-carrier modulation such as OFDM (Orthogonal Frequency Division Multiplexing).

2. Description of the Related Art

According to conventional AMC (Adaptive Modulation and Coding), a mobile station has measured the radio transmission path quality based on a receive signal from a base station, and the transmission format has been selected from a preset table MCS (Modulation and Coding set) on the basis of the measurement result.

In a system employing CDM (Code Division Multiplexing) as the multiplexing scheme, even if the AMC is employed, interference between radio zones (cells) formed by the respective base stations is identified as heat noise. Thus, little influence is given to the transmission even if any transmission format is employed.

When the multiplexing scheme is FDM (Frequency Division Multiplex) and TDM (Time Division Multiplex), however, the interference between the cells cannot be identified as heat noise and, therefore, a great influence is given to the transmission. The similar problem occurs even in the OFDM modulation (for example, 3GPP, TS 25.214 V5.11.0 (2005-06), 6A HS-DSCH-related procedures) that has been developed recently since its multiplexing scheme is the FDM or the TDM.

There is a problem that in the radio communication system employing the conventional multi-carrier modulation, a great influence is given to the transmission since the interference between the cells cannot be identified as heat noise.

BRIEF SUMMARY OF THE INVENTION

The present invention has been accomplished to solve the above-described problem. The object of the present invention is to provide a radio communication system capable of restricting deterioration of the transmission quality even in an area where the interference between the cells gives a great influence.

To achieve this object, an aspect of the present invention is a radio communication system employing multi-carrier modulation for determining a transmission format in accordance with a reception quality of a first communication device and transmitting data from a second communication device to the first communication device in the transmission format. The system comprises selection means for selecting a transmission format, of a transmission format candidate group including at least two transmission formats, and radio communication means for transmitting data from the second communication device to the first communication device in the transmission format selected by the selection means. In at least one transmission format, of the transmission format candidate group, transmission data are subjected to repetition at more than two times after interleaving.

According to the present invention, the interference generated in the receive signal of the first communication device is detected, the transmission format is selected on the basis of the detection result, and the data is transmitted from the second communication device to the first communication device in the selected transmission format.

Therefore, the present invention can provide the radio communication system and the radio communication method wherein the data can be transmitted in the transmission format corresponding to the interference generation conditions in the first communication device and the deterioration in the transmission quality can be thereby restricted even in the area where the influence from the interference between the cells is great.

Additional objects and advantages of the invention will be set forth in the description which follows, and in part will be obvious from the description, or may be learned by practice of the invention. The objects and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings. In the following descriptions, the OFDM is employed as the modulation scheme for the communications between the base station and the mobile station.

Figure 1:
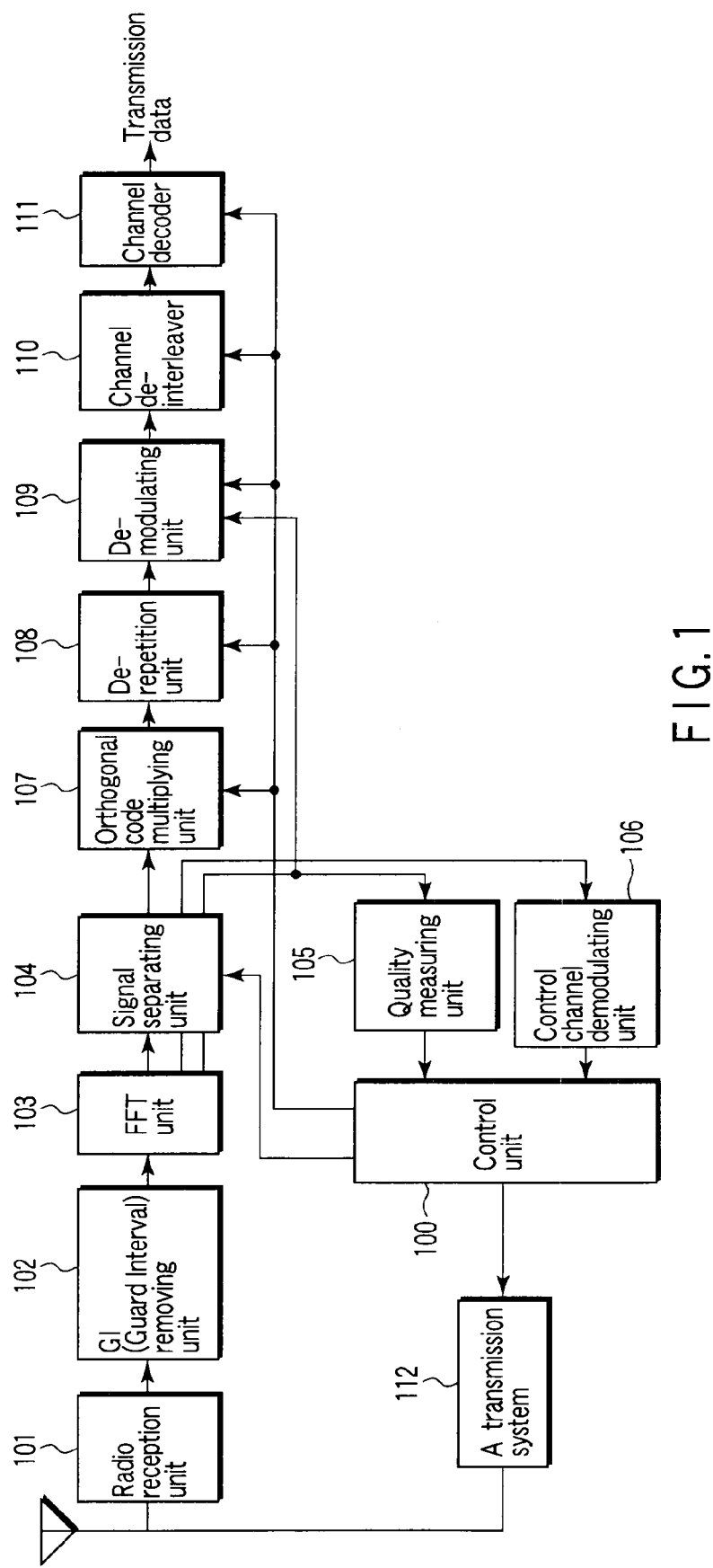
FIG. 1 is a block diagram showing a configuration of a mobile station in a radio communication system according to the present invention.

First, a configuration of the mobile station of the radio communication system according to the embodiment of the present invention is described. FIG. 1 mainly shows a configuration of a downlink reception system of the mobile station. As shown in FIG. 1, the mobile station comprises a control unit 100, a radio reception unit 101, a GI (Guard Interval) removing unit 102, an FFT (Fast Fourier Transform) unit 103, a signal separating unit 104, a quality measuring unit 105, a control channel demodulating unit 106, an orthogonal code multiplying unit 107, a de-repetition unit 108, a demodulating unit 109, a channel de-interleaver 110, a channel decoder 111, and a transmission system 112.

The radio reception unit 101 comprises a bandpass filter which receives a radio signal transmitted from the base station and removes noise out of a desired band from the received signal, and an A/D converter which converts the signal passing through the filter into a baseband digital signal.

The GI removing unit 102 removes a guard interval from the baseband digital signal output from the radio reception unit 101.

The FFT unit 103 executes fast Fourier transform for the digital signal output from the GI removing unit 102, converts the signal of the time domain into a signal of a frequency domain, and splits the signal into signals of respective sub-carriers.

The signal separating unit 104 separates the signals split for the respective sub-carriers into a phase reference signal, a control signal, a data signal, etc. and outputs the separated signals to modules respectively corresponding thereto. In this embodiment, the phase reference signal is output to the quality measuring unit 105 and the demodulating unit 109, the control signal is output to the control channel demodulating unit 106, and the data signal is output to the orthogonal code multiplying unit 107.

The quality measuring unit 105 measures the power level or power density of the signal received from each of the base stations, by cross-correlation between a scrambling pattern assigned to each of the base stations and the received phase reference signal. Then, the quality measuring unit 105 determines the base station making radio communication from the measurement result, and obtains an interference level from a ratio of the received power level of the determined base station to receiving power levels of the other base stations.

Figures 2, 3:
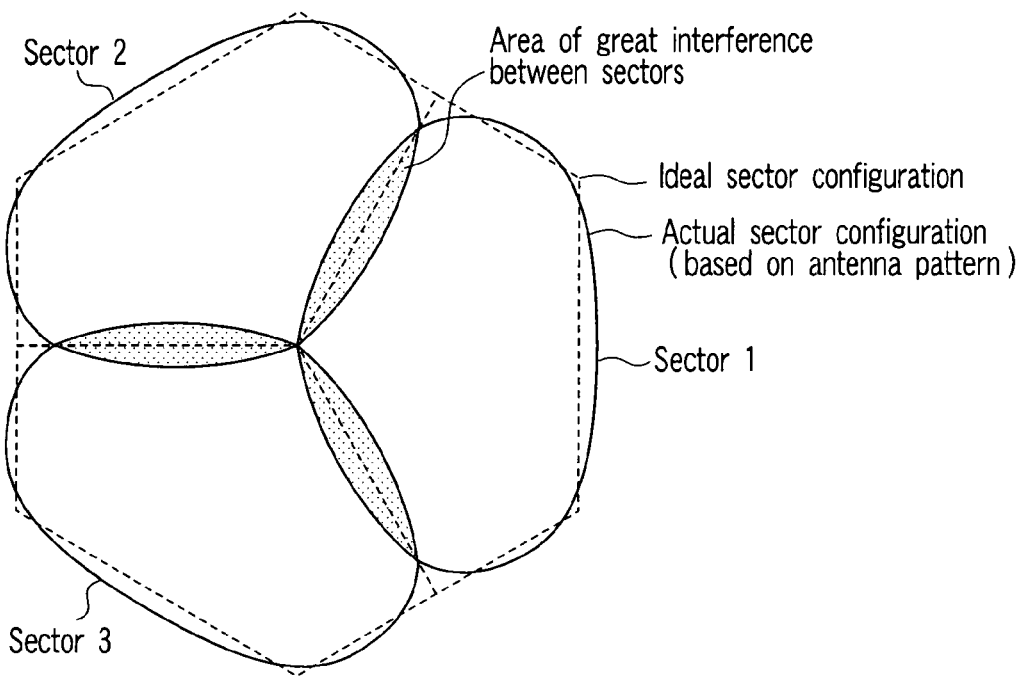
FIG. 2 is an illustration showing areas where interference occurs.
FIG. 3 is a transmission format table stored in the base station and the mobile station in the radio communication system according to the present invention.

As shown in FIG. 2, even when a single base station forms a plurality of sectors, antenna patterns cannot be formed ideally. Thus, interference occurs between the sectors of the same base station and gives influences to the transmission. The quality measuring unit 105 distinguishes receive signals of the respective sectors, in the same base station, by the scrambling pattern, and also obtains the interference between the sectors.

The control channel demodulating unit 106 demodulates the control channel received from the signal separating unit 104, extracts control information on physical layers, and outputs the control information to the control unit 100. The control information includes MCS information representing a transfer format transmitted from the base station.

The orthogonal code multiplying unit 107 multiplies the data signal by a complex conjugate of an orthogonal code corresponding to parameter N directed by the control unit 100, cancels signals from the other base stations, and outputs a result of the multiplication. If the parameter N=1, the orthogonal code multiplying unit 107 outputs the data signal as it is, without multiplying the data signal by the complex conjugate of the orthogonal code.

The de-repetition unit 108 accumulates multiplication results of the orthogonal code multiplying unit 107, for the parameter N directed by the control unit 100, and outputs the multiplication results as one data item. If the parameter N=1, the de-repetition unit 108 outputs the multiplication results as they are without accumulating the multiplication results.

The demodulating unit 109 obtains channel estimates of the sub-carrier frequency from the phase reference signal, executes channel equalization of the output of the de-repetition unit 108 by using the channel estimates, demodulates the equalization result in the demodulation mode directed by the control unit 100, and regenerates bit sequences included in the data signal.

The channel de-interleaver 110 executes channel de-interleaving of the bit sequences output from the demodulating unit 109, on the basis of the interleaving pattern directed by the control unit 100.

The channel decoder 111 executes channel decoding of the bit sequences output from the channel de-interleaver 110 at a coding rate R directed by the control unit 100 and regenerates transmit data.

The control unit 100 generates control information indicating the interference level obtained by the quality measuring unit 105 and transmits the generated control information to the base station via the transmission system 112.

In addition, the control unit 100 stores a transmission format table shown in FIG. 3. In the transmission format table, information items such as MCS information to distinguish the transmission format, modulation scheme M, coding rate R, parameter N to determine the number of repetition and orthogonalization, etc. are associated.

Then, the control unit 100 detects the MCS information from the control information extracted by the control channel demodulating unit 106, and recognizes that the transmission format which the base station is to use for the transmission to the mobile station is the transmission format indicated by the MCS information. The control unit 100 controls all the units of the mobile station by the parameter corresponding to the MCS information so as to receive the information transmitted from the base station by referring to the transmission format table.

Figure 4:
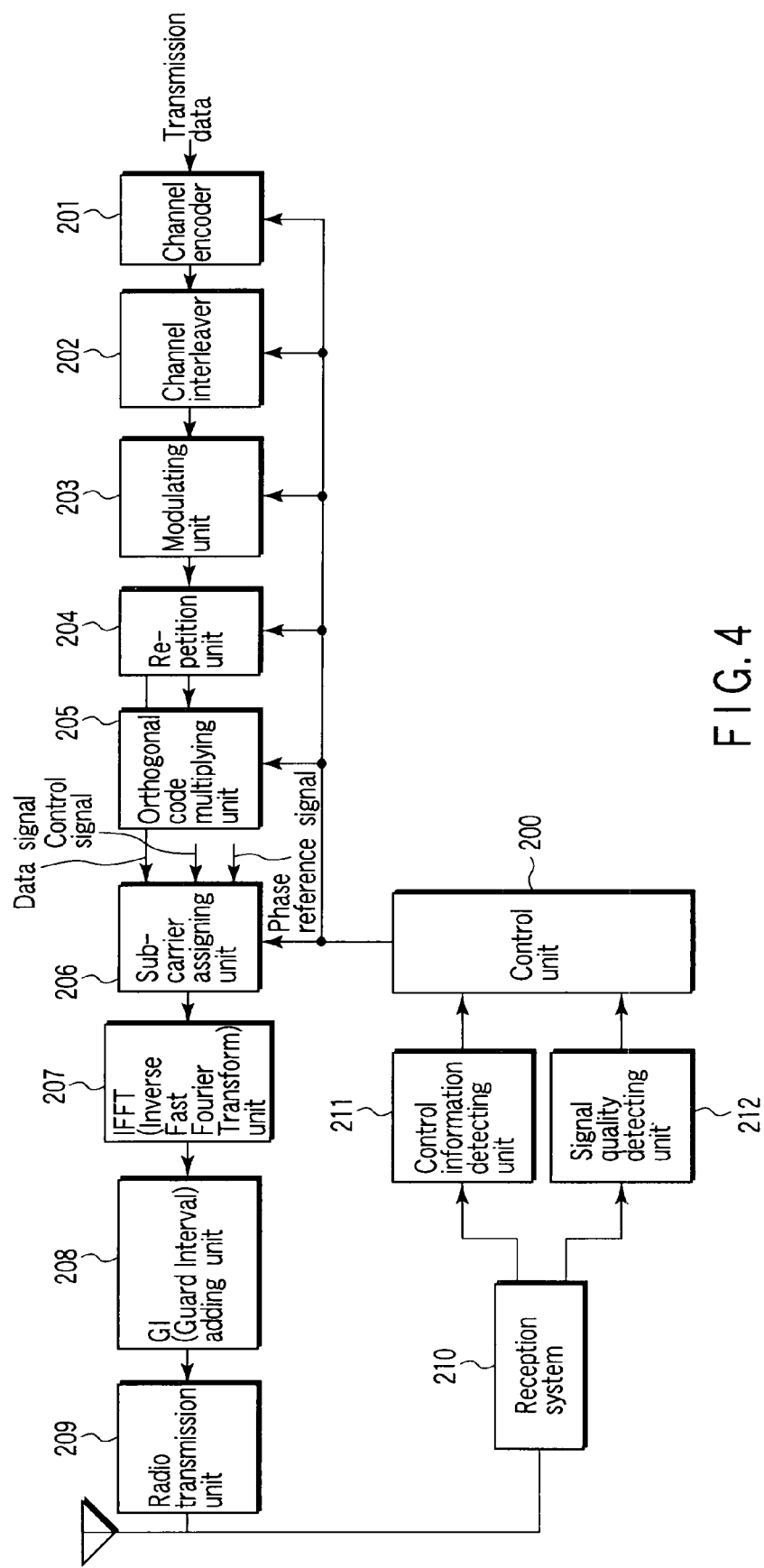
FIG. 4 is a block diagram showing a configuration of a base station in the radio communication system according to the present invention.

Next, a configuration of the base station in the radio communication system according to the embodiment of the present invention is described. FIG. 4 mainly shows a configuration of a downlink transmission system of the base station. As shown in FIG. 4, the base station comprises a control unit 200, a channel encoder 201, a channel interleaver 202, a modulating unit 203, a re-petition unit 204, an orthogonal code multiplying unit 205, a sub-carrier assigning unit 206, an IFFT (Inverse Fast Fourier Transform) unit 207, a GI (Guard Interval) adding unit 208, a radio transmission unit 209, a reception system 210, a control information detecting unit 211, and a signal quality detecting unit 212.

The channel encoder 201 executes channel encoding of bit sequences included in the transmit data, at a coding rate R directed by the control unit 200.

The channel interleaver 202 executes channel interleaving of an output of the channel encoder 201, on the basis of an interleaving pattern directed by the control unit 200.

The modulating unit 203 modulates an output of the channel interleaver 202 in modulation scheme M directed by the control unit 200 and generates a data signal represented by a complex number value.

The re-petition unit 204 executes repetition processing of the data signal on the basis of the parameter N directed by the control unit 200 and enlarges each of the bits included in the data signal into N bits. If N=1, the re-petition unit 204 does not execute repetition processing.

The orthogonal code multiplying unit 205 multiplies an output of the re-petition unit 204 by an orthogonal code having N-bit length on the basis of the parameter N directed by the control unit 200. If N=1 is directed, the orthogonal code multiplying unit 205 does not execute multiplication of the orthogonal code.

The sub-carrier assigning unit 206 generates signals by assigning the data signal, control signal and phase reference signal output from the orthogonal code multiplying unit 205 to the respective sub-carriers corresponding thereto, in accordance with the directions from the control unit 200.

The IFFT unit 207 executes OFDM modulation of the signals output from the sub-carrier assigning unit 206 to generate an OFDM signal as a sequence of a plurality of OFDM symbols. In other words, the IFFT unit 207 generates the OFDM signal by converting signals of the frequency domain into signals of the time domain.

The GI adding unit 208 adds guard interval to the OFDM signal output from the IFFT unit 207 and outputs the OFDM signal.

The radio transmission unit 209 comprises a digital-to-analog converter for digital-to-analog conversion of the output of the GI adding unit 208, an up-converter which up-converts an output of the digital-to-analog converter, and a power amplifier for power amplification of an output of the up-converter. A radio (RF) signal is generated by these modules and transmitted from the antenna.

The reception system 210 receives a radio signal transmitted from the mobile station.

The control information detecting unit 211 detects control information transmitted to the own base station, in the signal which the reception system 210 receives from the mobile station.

The signal quality detecting unit 212 detects the quality of the signal which the reception system 210 receives from the mobile station.

The control unit 200 stores the transmission format table shown in FIG. 3. Then, the control unit 200 determines which transmission format is used for the transmission to the mobile station, on the basis of the control information detected by the control information detecting unit 211 (including information indicating the interference level) and the signal quality detected by the signal quality detecting unit 212, and transmits the MCS information indicating the determined transmission format to the mobile station together with the control information.

The transmission format prestored in the control unit 200 is composed of a combination of the modulation scheme M, the coding rate R, the parameter N to determine the number of repetition and the orthogonalization, and distribution to the coding rate R and the number of repetition N is varied. It is discriminated whether or not the location of the mobile station is subject to interference, on the basis of the control information and the signal quality, and the transmission format is determined according to the discrimination result.

When the control unit 200 thus determines the transmission format and transmits the MCS information indicating the determined transmission format to the mobile station, the control unit 100 controls all the units of the mobile station so as to transmit the data signal in the transmission format to the mobile station.

For example, if the control unit 200 discriminates that the interference is great in the area where the mobile station considered as the transmission destination is located since the interference level indicated by the control information received from the mobile station exceeds a preset threshold value, the control unit 200 directs the re-petition unit 204 and the orthogonal code multiplying unit 205 to execute the repetition for the data signal transmitted to the mobile station in accordance with the magnitude of the interference.

Figure 5:
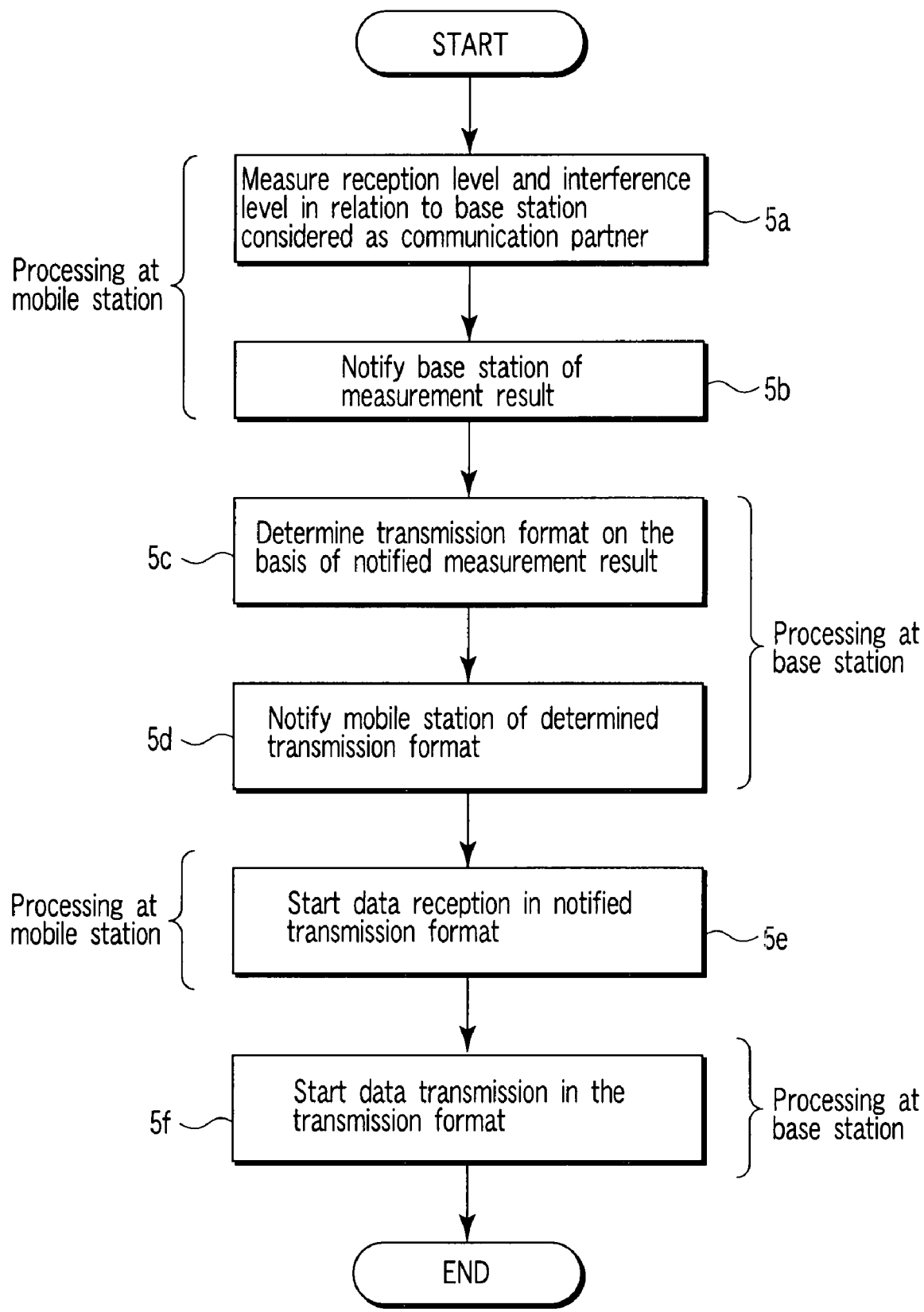
FIG. 5 is a flowchart showing an operation flow of the radio communication system according to the present invention.

Next, the operations of the radio communication system having the above configuration are described with reference to FIG. 5.

First, in step 5a, the quality measuring unit 105 of the mobile station measures the reception level and the interference level with the other base stations, in relation to the base station considered as the communication partner, and the operation shifts to step 5b.

In step 5b, the control unit 100 of the mobile station controls the transmission system 112 to transmit the measurement result obtained in step 5a to the base station considered as the communication partner, and the operation shifts to step 5c.

In step 5c, the control unit 200 of the base station determines the transmission format used for the transmission to the mobile station, on the basis of the control information detected by the control information detecting unit 211 and the detection result of the signal quality detecting unit 212. If the control unit 200 discriminates that the interference is great in the area where the mobile station considered as the transmission partner is located since the interference level indicated by the control information received from the mobile station exceeds the preset threshold value, the control unit 200 determines use of the transmission format resistant to the interference.

In step 5d, the control unit 200 of the base station controls all the units of the transmission system to notify the mobile station of the transmission format determined in step 5c as the MCS information, and the operation shifts to step 5e.

In step 5e, the control channel demodulating unit 106 of the mobile station extracts the MCS information notified by the base station. The control unit 100 controls all the units of the reception system to execute the data reception in the transmission format based on the MCS information, and the operation shifts to step 5f.

In step 5f, the control unit 200 of the base station controls all the units of the transmission system to execute the data transmission in the transmission format notified in step 5d.

Figure 6:
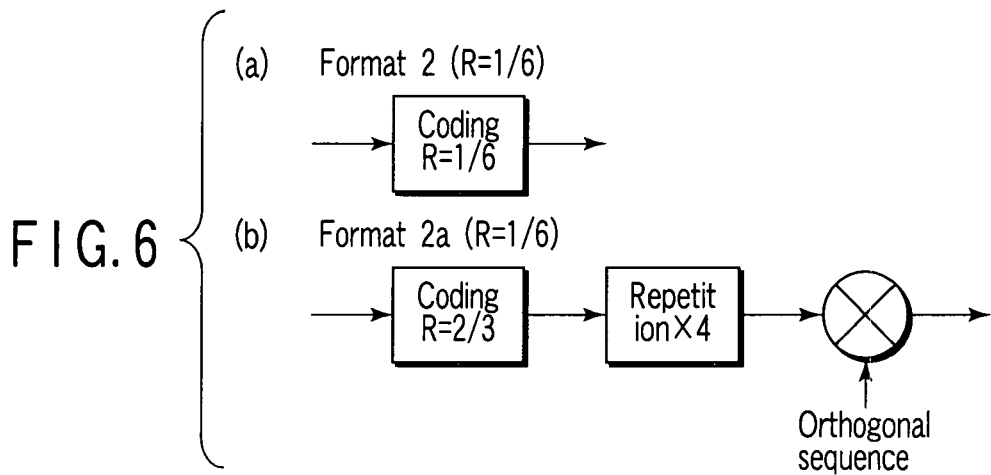
FIG. 6 is an illustration showing signal generation according to a transmission format determined in the operation flow of FIG. 5.

In the transmission format table shown in FIG. 3, for example, if the total coding rate is Rt=⅙, the transmission format to be used is considered to be 2 and 2a. Transmission format 2 implements Rt=⅙ by the error-correcting-coding as shown in FIG. 6(a). On the other hand, format 2a executes quadruple (=N) repetition for orthogonalization after executing error-correcting-coding of R=⅔, as shown in FIG. 6(b), and totally implements Rt=⅙.

In general, since the coding gain becomes greater by error-correcting-coding based on an appropriate operation, rather than simply repeating error-correcting-coded sequence, desired SNR of the format 2 becomes lower that that of the format 2a. If noise N is constant, preferable reception can be executed with smaller receiving power S, in the format 2. Therefore, the control unit 200 selects the format 2, in an area where there is small interference between the sectors, such as the outside of the sector boundary, in step 5c.

However, if there is the interference between the sectors, such as the sector boundary, the interference can be restricted by the orthogonalization effect, by executing the repetition and multiplying the orthogonal sequences which have the same length as the repetition and which are different in each sector. Since more gain than the reduced coding gain can be thereby obtained, the transmission speed is increased. For this reason, if the interference is strong, the control unit 200 selects the format 2a in step 5c.

In addition, the equivalent transmission speed (relative value) can also be obtained by varying not only the error-correcting-coding rate and the count of repetition, but also the number of multivalue of modulation (modulation scheme M), similarly to transmission formats 3 and 3a, and transmission formats 4 and 4a, in the transmission format table of FIG. 3.

Figure 7:
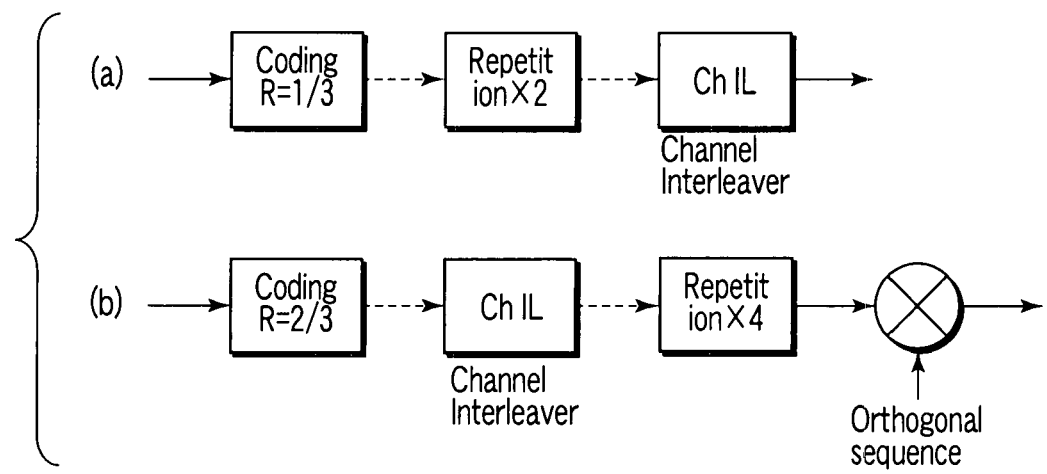
FIG. 7 is an illustration showing signal generation according to a transmission format determined in the operation flow of FIG. 5.

FIG. 7 shows an example of Rt=⅙ considering the channel interleaver as well employed in an actual system. Interleaving can enhance the error-correcting-coding effect by aligning the data at random. Therefore, interleaving is generally carried out after the repetition.

However, if orthogonalization is executed as done in the base station shown in FIG. 4, it is desirable that transmission path characteristics of the orthogonalized bits should be the same. Therefore, the repetition is selectively executed after the interleaving. In other words, the base station has a transmission format in which the repetition is not executed after the channel interleaving as shown in FIG. 7(a), and a transmission format in which the repetition is executed and multiplied by the orthogonal code after the channel interleaving as shown in FIG. 7(b).

After the interleaving, either bit-unit repetition executed before mapping of QPSK modulation or the symbol-unit repetition executed after the mapping may be applied to the transmission format.

Figure 8:
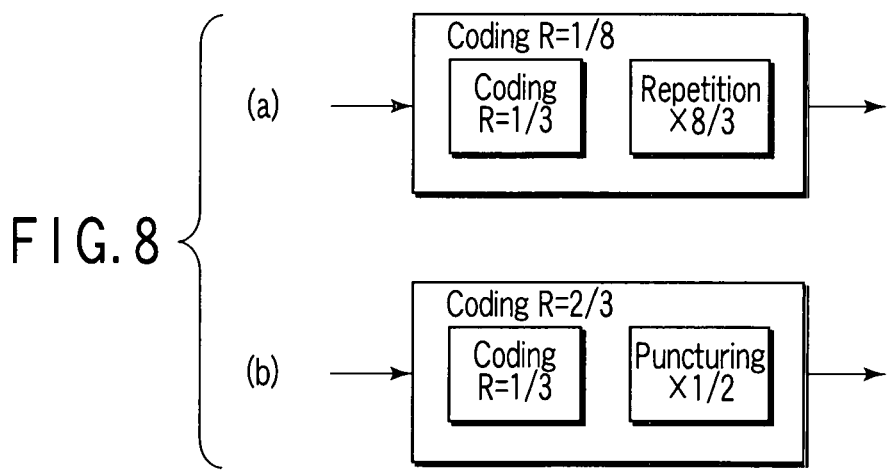
FIG. 8 is an illustration showing signal generation according to a transmission format determined in the operation flow of FIG. 5.

FIG. 8 shows a transmission format in which (a) repetition or (b) puncturing is executed, at the encoding. The repetition shown in the figure is different from repetition for orthogonalization and is used to adjust the coding rate. The coding rate may be adjusted by such repetition or puncturing.

For example, this operation is indicated by the repetition shown in FIG. 7(a). The error-correcting code R=⅓ is repeated twice to form R=⅙.

In addition, for example, R=⅙ in FIG. 6(a) can be formed similarly to FIG. 7(a). FIG. 7(b) shows format 2a. The transmission format 1 of FIG. 3 can be formed by repeating the error-correcting code R=⅓ at ⅔ times as shown in FIG. 8(a). Therefore, the transmission speed of the transmission format 2a in which quadruple repetition is executed after interleaving is equivalent to the transmission format 2 in which the repetition is executed before the interleaving. The transmission speed is higher than that of the transmission format 1 in which the repetition is executed before interleaving.

In the radio communication system having the above configuration, it is discriminated whether or not the mobile station is influenced by the interference. If the mobile station is influenced by the interference, the suitable transmission format (restriction of interference using orthogonalization) is selected and the communication is established. If there is small influence from the interference, the transmission format in which the coding gain is handled with priority is selected and the communication is established. Therefore, the transmission speed can be made higher, and the throughput can be enhanced over the entire system in the area where the influence of interference is small.

Figure 9:
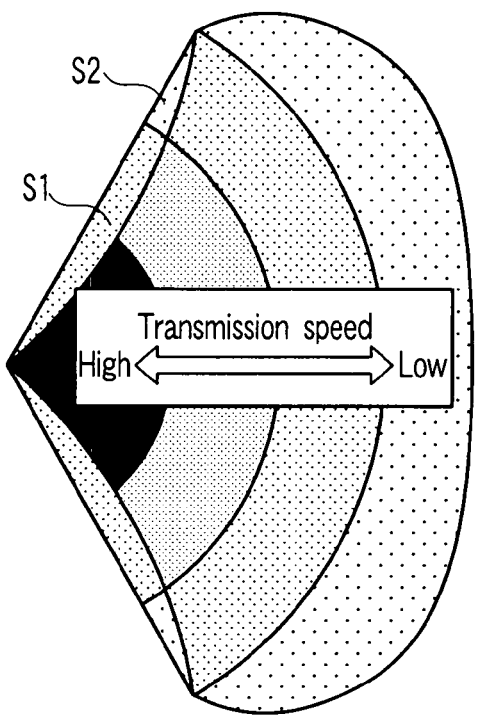
FIG. 9 is an illustration showing a distribution of a transmission speed in a case where the transmission format is determined without considering interference.
Figure 10:
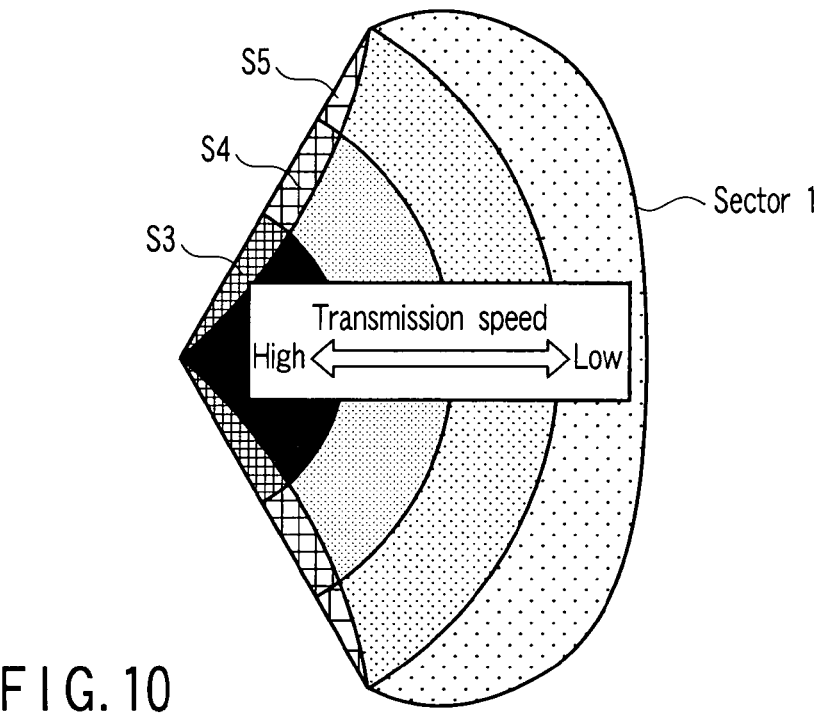
FIG. 10 is an illustration showing a distribution of a transmission speed in a case where the transmission format is determined by considering the interference.

In general, the transmission format in which the transmission speed is high can be assigned to the base station as the mobile station is closer to the base station as shown in FIG. 9. If the transmission format is determined without considering the influence of the interference, the transmission speed is enhanced to S3, S4 (S1<S4<S3) and S5 (S2<S5) as shown in FIG. 10, even in the area where the transmission speed is S1 or S2 in the sector boundary as shown in FIG. 9.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, in the above embodiment, the base station determines the transmission format in accordance with the interference level measured by the base station, and executes the data transmission in a transmission format according to the determined transmission format. Instead of this, the mobile station may determine the transmission format and the base station may execute the transmission for the mobile station in a transmission format according to the determined transmission format.

In addition, the location information on the location of the mobile station is detected, and it is determined whether or not the mobile station is located in a place which is influenced by the interference, on the basis of the location information. On the basis of the determination result, or the determination result and the interference level measured by the mobile station, the transmission format may be determined. In this case, too, the transmission format may be determined by the mobile station or the base station.

Various kinds of methods of detecting the location information of the mobile station are considered. For example, the mobile station may comprise a GPS (Global Positioning System) receiver to obtain its own location or may detect the location by a difference of arrival times of signals received from a plurality of base stations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system employing multi-carrier modulation for determining a transmission format in accordance with a reception quality of a first communication device and for transmitting data from a second communication device to the first communication device in the transmission format, the system comprising:

measuring means for measuring an interference level as a condition of the reception quality;

selection means for selecting a transmission format from a transmission format candidate group, based on the measured interference level; and radio communication means for transmitting data from the second communication device to the first communication device in the transmission format selected by the selection means, wherein the transmission format candidate group comprises a first transmission format and a second transmission format having a same coding rate, the second transmission format being a transmission format which subjects transmission data to repetition at more than two times after interleaving, and wherein an interference level in a case in which the selection means selects the second transmission format is higher than an interference level in a case in which the selection means selects the first transmission format.

2. The system according to claim 1, wherein the transmission format candidate group includes transmission formats other than the transmission format in which the repetition is executed at more than two times, and an information transmission speed of at least one transmission format in the transmission format candidate group is lower than an information transmission speed of a maximum information transmission speed in the transmission format in which the repetition is executed at more than two times.

3. The system according to claim 2, wherein in at least one transmission format in the transmission format candidate group, an orthogonal code is multiplied and orthogonalized after executing the repetition.

4. The system according to claim 1, wherein in at least one transmission format in the transmission format candidate group, interleaving is executed after executing the repetition, for the transmission data.

5. A radio communication method employing multi-carrier modulation for determining a transmission format in accordance with a reception quality of a first communication device and for transmitting data from a second communication device to the first communication device in the transmission format, the method comprising:
   measuring an interference level as a condition of the reception quality;
   selecting a transmission format from a transmission format candidate group, based on the measured interference level and
   transmitting data from the second communication device to the first communication device in the selected transmission format,
   wherein the transmission format candidate group comprises a first transmission format and a second transmission format having a same coding rate, the second transmission format being a transmission format which subjects transmission data to repetition at more than two times after interleaving, and
   wherein an interference level in a case in which the second transmission format is selected is higher than an interference level in a case in which the first transmission format is selected.

6. The method according to claim 5, wherein the transmission format candidate group includes transmission formats other than the transmission format in which the repetition is executed at more than two times, and an information transmission speed of at least one transmission format in the transmission format candidate group is lower than an information transmission speed of a maximum information transmission speed in the transmission format in which the repetition is executed at more than two times.

7. The method according to claim 6, wherein in at least one transmission format in the transmission format candidate group, an orthogonal code is multiplied and orthogonalized after executing the repetition.

8. The method according to claim 5, wherein in at least one transmission format in the transmission format candidate group, interleaving is executed after executing the repetition, for the transmission data.

* * * * *